United States Patent
Jonsson et al.

(10) Patent No.: US 7,848,387 B2
(45) Date of Patent: Dec. 7, 2010

(54) RECEIVER PARAMETRIC COVARIANCE ESTIMATION FOR TRANSMIT DIVERSITY

(75) Inventors: Elias Jonsson, Malmö (SE); Yi-Pin Eric Wang, Cary, NC (US); Gregory E. Bottomley, Cary, NC (US); Stephen J. Grant, Cary, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 718 days.

(21) Appl. No.: 11/751,109

(22) Filed: May 21, 2007

(65) Prior Publication Data

US 2008/0291978 A1 Nov. 27, 2008

(51) Int. Cl.
*H04B 1/00* (2006.01)

(52) U.S. Cl. .................. 375/144; 375/130; 375/141; 375/142; 375/147; 375/148; 375/149; 375/150; 375/340; 375/342; 375/343; 375/347

(58) Field of Classification Search ............ 375/130, 375/140–142, 144, 147–150, 340–347
See application file for complete search history.

(56) References Cited

U.S. PATENT DOCUMENTS

| | | | |
|---|---|---|---|
| 6,005,887 A | 12/1999 | Bottomley et al. | |
| 6,285,861 B1 | 9/2001 | Bonaccorso et al. | |
| 6,738,020 B1 | 5/2004 | Lindskog et al. | |
| 2003/0099216 A1 | 5/2003 | Nilsson et al. | |
| 2005/0078742 A1 | 4/2005 | Cairns et al. | |
| 2005/0201447 A1* | 9/2005 | Cairns et al. | 375/148 |
| 2005/0215218 A1 | 9/2005 | Bottomley et al. | |
| 2006/0007990 A1* | 1/2006 | Cozzo et al. | 375/148 |
| 2006/0126568 A1 | 6/2006 | Pan et al. | |
| 2008/0095279 A1* | 4/2008 | Reial et al. | 375/343 |

FOREIGN PATENT DOCUMENTS

WO 2005/096517 A1 10/2005

OTHER PUBLICATIONS

"International Search Report," International Application No. PCT/EP2008/055903, mailed Sep. 16, 2008, European Patent Office, Rijswijk, Netherlands.
Co-pending U.S. Appl. No. 11/935,840, filed Nov. 7, 2007.
Grant, Stephen et. al., "Per-Antenna-Rate-Control (PARC) in Frequency Selective Fading with SIC-GRAKE Receiver", Vehicular Technology Conference IEEE 60th, Fall 2004, pp. 1458-1462, vol. 2.

(Continued)

*Primary Examiner*—Mohammad H Ghayour
*Assistant Examiner*—Sophia Vlahos
(74) *Attorney, Agent, or Firm*—Coats & Bennett, P.L.L.C.

(57) ABSTRACT

A parametric form of G-Rake and chip equalization for closed-loop transmit diversity is provided, that accounts for impairment correlation between transmit antennas. In a closed-loop transmit diversity system, the base station transmits a signal from two or more antennas, using one of a predetermined set of relative phase offsets at one of the antennas. The parametric estimation of the impairment or data covariance is performed by summing terms, including a term for each possible phase offset. The terms are weighted by fitting parameters. The fitting parameters are jointly solved by fitting the impairment or data covariance estimate to a measured impairment or data covariance. In another aspect, a measured impairment covariance is formed by exploiting a special relationship between the pilot channels of the different transmit antennas.

32 Claims, 4 Drawing Sheets

OTHER PUBLICATIONS

Ringström, Markus et. al., "On Closed Loop Transmit Diversity for HSDPA", Vehicular Technology Conference IEEE 61$^{st}$, Spring 2005, pp. 344-348, vol. 1.

Cairns, Douglas and Bommonley, Gregory E., "Method and Apparatus for Interference Estimation in a Generalized Rake Receiver." Jun. 30, 2006, U.S. Appl. No. 11/479,483.

Jatunov, Loran A. and Madisetti, Vijay, K., "Closed-Form for Infinite Sum in Bandlimited CDMA." IEEE Communications Letters, Mar. 2004, pp. 138-140, vol. 8, No. 3.

Bottomley, Gregory, et. al., "Method and Apparatus for Suppressing Interference Based on Channelization Code Power Estimation with Bias Removal." Filed on Dec. 5, 2006, 34 pages, U.S. Appl. No. 11/566,756.

* cited by examiner

US 7,848,387 B2

RECEIVER PARAMETRIC COVARIANCE ESTIMATION FOR TRANSMIT DIVERSITY

FIELD OF THE INVENTION

The present invention relates generally to wireless communication systems, and in particular to a parametric system and method for covariance estimation in a wireless communication system employing transmit diversity.

BACKGROUND

Spread-spectrum communication systems are well known in the art and widely deployed. A class of receivers well-suited for spread-spectrum systems—such as IS-95, IS-2000 (cdma2000), and WCDMA—is a linear interference-whitening (LIW) receiver. LIW receivers suppress interference in addition to collecting signal energy. One form of LIW receiver is a transversal chip equalizer; another is a G-Rake receiver. The Rake receiver derives its name from its rake-like appearance, wherein multiple, parallel receiver fingers are used to receive multiple signal images in a received multipath signal. By coherently combining the finger outputs in a weighted Rake combiner, the conventional Rake receiver can use multipath reception to improve the Signal to Interference-plus-Noise Ratio (SINR) of the received signal. A Generalized Rake (G-Rake) receiver improves interference suppression performance over a conventional Rake receiver by increasing the sophistication of combining weight generation.

LIW receivers satisfy the requirements for type II receivers for the WCDMA downlink, as specified in the RAN4 of 3GPP. These requirements were formulated assuming a single transmit antenna at a base station. However, WCDMA defines two transmit diversity modes. Published U.S. patent application number 2005/0201447, METHOD AND APPARATUS FOR PARAMETER ESTIMATION IN A GENERALIZED RAKE RECEIVER, filed Mar. 12, 2004, assigned to the assignee of the present application and incorporated herein by reference in its entirety, discloses a solution for G-Rake receivers in a transmit diversity system. The solution describes a parametric approach to estimating an impairment covariance matrix used to form G-Rake combining weights. The parametric approach estimates the impairment covariance as a sum of terms, including a separate term for each transmit antenna.

This solution works well for an open-loop transmit diversity mode. In the open-loop mode, the impairment due to each transmit antenna during a particular symbol period is uncorrelated, since different symbols are transmitted from the different antennas. In a closed-loop mode, however, the mobile terminal specifies a phase offset, and the same symbol is transmitted by a primary antenna and simultaneously by a secondary antenna with the specified phase offset. In this case, the impairment due to each transmit antenna is highly correlated. This correlation may be exploited to improve interference suppression and hence, receiver performance.

SUMMARY

According to one or more embodiments described and claimed herein, a parametric form of G-Rake and chip equalization for closed-loop transmit diversity is provided, that accounts for impairment correlation between Rake fingers or equalizer taps. In a closed-loop transmit diversity system, the base station transmits a signal from two or more antennas, using one of a predetermined set of relative phase offsets at one of the antennas. The parametric estimation of the impairment or data covariance is performed by summing terms, including a term for each possible phase offset. The terms are weighted by fitting parameters. The fitting parameters are jointly solved by fitting the impairment or data covariance estimate to a measured impairment or data covariance. In another aspect, a measured impairment covariance is formed by exploiting a special relationship between the pilot channels of the different transmit antennas.

One embodiment relates to a method of processing a received information signal transmitted from at least primary and secondary transmit antennas. A spread-spectrum information signal transmitted from at least primary and secondary transmit antennas is received, the second antenna transmitting the signal at one of a plurality of known phase offsets relative to the primary antenna. An impairment or data covariance is estimated as a sum of terms corresponding to the plurality of relative transmit phases of the secondary antenna, each covariance term scaled by a corresponding fitting parameter. An impairment or data covariance associated with the received information signal is measured. Values of the fitting parameters are jointly estimated in response to the measured impairment covariance. A received signal impairment covariance for the received information signal is estimated by applying the estimated values of the fitting parameters to the impairment covariance terms.

Another embodiment relates to a wireless communication receiver for use in a mobile terminal in a transmit diversity wireless communication system. The receiver includes a radio front-end circuit configured to provide a received signal of interest transmitted simultaneously from a primary antenna and from a secondary antenna with one of a plurality of relative phase offsets. The receiver further includes a receiver circuit configured to generate one or more combined signals from despreading the received signal of interest. The receiver circuit is configured to calculate combining weights by computing a covariance associated with each possible phase offset at the secondary antenna; measuring a covariance from the received signal, jointly estimating values of fitting parameters in response to the computed covariance terms and measured covariance; and estimating a received signal covariance for the signal of interest by applying the estimated values of the fitting parameters to a parametric covariance model terms.

DETAILED DESCRIPTION

Figure 1:
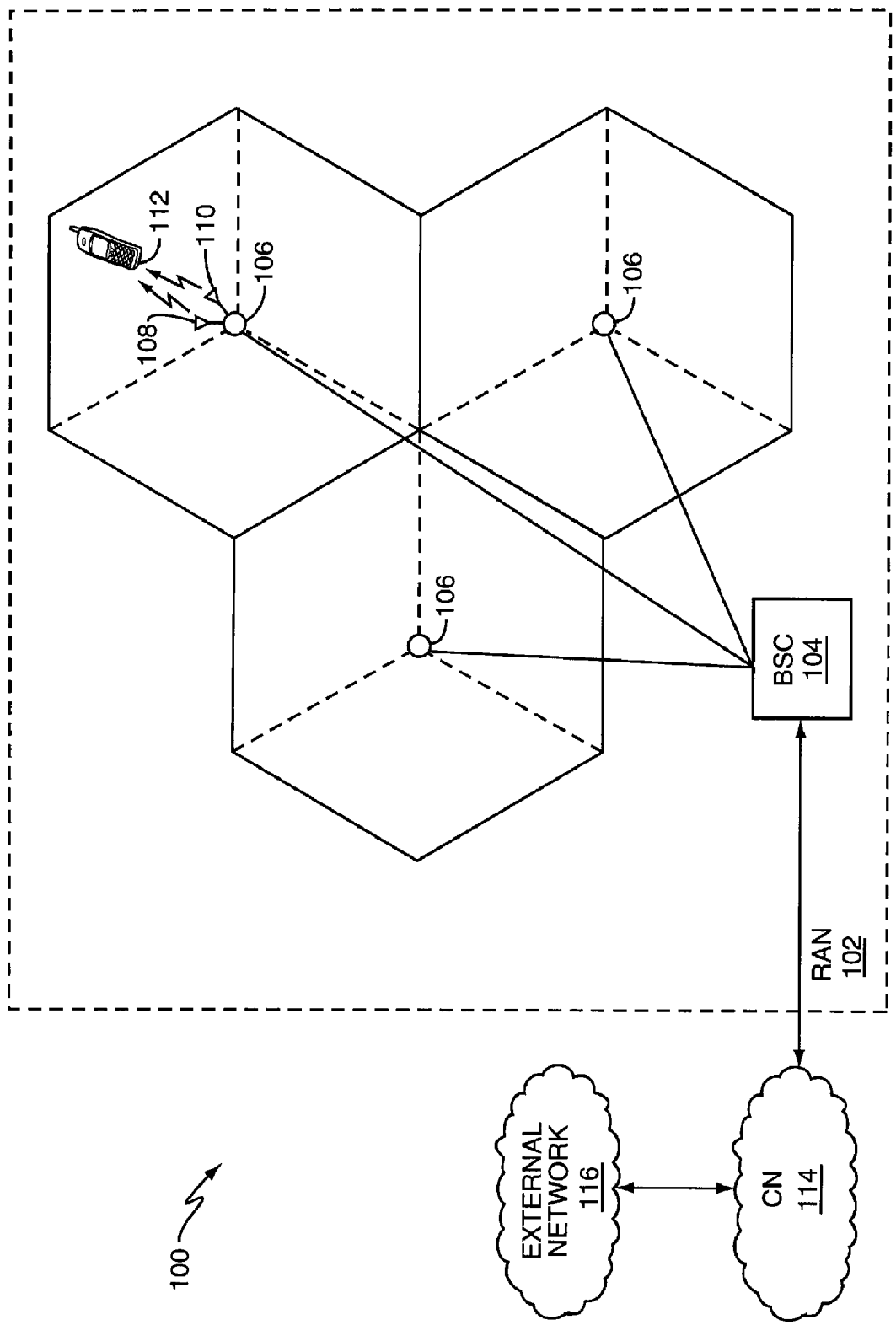
FIG. 1 is a functional block diagram of a wireless communication system employing transmit diversity.

FIG. 1 depicts a wireless communication system 100 employing transmit diversity. Within a Radio Access Network (RAN) 102, a Base Station Controller (BSC) 104 controls a plurality of Radio Base Stations (RBS) 106, also known in the art as Base Transceiver Stations (BTS). The BSC 104 and an RBS 106 together comprise a "base station." Each base station provides radio communication services with subscriber mobile terminals 112 within a geographic area called a cell, which may be divided into sectors, as depicted in FIG. 1. The BSC 104 communicates with a Core Network (CN) 114, which in turn is connected to one or more external networks 116, such as the Public Switched Telephone Network (PSTN), the Internet, or the like.

Each base station includes at least a primary transmit antenna 108 and a secondary transmit antenna 110 (either per-cell or per-sector, depending on the network 100 configuration). The base station transmits the same information signal from both antennas 108, 110. The signal transmitted on the secondary antenna 110 is weighted relative to the signal transmitted on the primary antenna 108, wherein the transmit weights may comprise phase offset only, or may more generally comprise a complex quantity having both phase and amplitude. The phase shift employed is determined by feedback from the mobile terminal 112, thus forming a closed-loop transmit diversity system. As one non-limiting example, in the WCDMA standard, the relative phases ($\theta_i$) of the secondary antenna are 45, 135, 225, or 315 degrees, or $$\theta_i = \pi\left(-\frac{1}{4} + \frac{i}{2}\right)$$

in radians. Embodiments of the present invention are described herein with respect to this standard, although the invention is not so limited, and the inventive concepts disclosed and claimed herein may be advantageously applied to a wide array of transmit diversity systems. In general, the two transmit antennas can have different filters applied, which can introduce different phase, amplitude, and delay characteristics. Usually single-tap filters are employed with a common delay, so that the two transmit antennas are characterized by different complex antenna weight values.

In addition to an information signal, the base station transmits a pilot channel from each transmit antenna 108, 110. The pilot channels comprise a series of pilot symbols. For the primary transmit antenna 108, a sequence of QPSK pilot symbols $s_p(k)$ are transmitted using a linked-256 Walsh code that is scrambled by a specific long code. In the WCDMA standard, the pilot symbols take on the same value $s_p(k)=(1+j)/\sqrt{2}$. The sample may be treated as purely real or purely imaginary, as described in U.S. Pat. No. 6,005,887, DESPREADING OF DIRECT SEQUENCE SPREAD SPECTRUM COMMUNICATIONS SIGNALS, issued Dec. 21, 1999 to Bottomley, et al., assigned to the assignee of the present application and incorporated herein by reference in its entirety.

For the secondary transmit antenna 110, the same Walsh code and the same scrambling code are used. However, the pilot symbol values are modified by a sequence $M_k$ such that $M_k s_p(k)$ is sent. For example, the sequence $M_k$ in slot 0 of every frame is given by $\{M_k; k=1,10\}=+1,-1,-1,+1,+1,-1,-1,+1,+1,-1.$ Thus, over the duration of each two symbol periods (512 chips), the pilot signals from the primary antenna 108 and the secondary antenna 110 are orthogonal. This can be viewed as two pilot channels using supersymbols of length 512 (referred to as nonoverlapping symbol periods). By contrast, each set of 256 chips corresponds to an overlapping pilot symbol period.

In general, the base station power allocated to the pilots on the primary and secondary antennas could be different. To reflect this, the power allocation parameters $\gamma_p(0)$ and $\gamma_p(1)$ are introduced. These quantities take values between 0 and 1 that represent the fraction of the total pilot power allocated to the pilots on the primary and secondary antenna, respectively. For the special case of equal pilot power allocation, $\gamma_p(0)=\gamma_p(1)=0.5$.

The pilot power allocation parameters are typically required by the receiver for accurate demodulation. One method for the receiver to obtain knowledge of these parameters is through downlink control signaling. For example, in Release 6 of the UMTS standard, the absolute pilot power on the primary antenna is signaled to the user equipment (UE) through higher layer signaling. The signaling could be augmented to include the absolute pilot power on the secondary antenna as well. From these two quantities, the UE can easily obtain the fractional allocations $\gamma_p(0)$ and $\gamma_p(1)$. An alternative method of obtaining these parameters is through the code-power estimation approach outlined in U.S. patent application Ser. No. 11/566,756 METHOD AND APPARATUS FOR SUPPRESSING INTERFERENCE BASED ON CHANNELIZATION CODE POWER ESTIMATION WITH BIAS REMOVAL filed Dec. 5, 2006 assigned to the assignee of the present application and incorporated herein by reference in its entirety. With this approach, the power allocated to each pilot is estimated at the UE from which the UE may easily obtain the fractional allocations $\gamma_p(0)$ and $\gamma_p(1)$.

Figure 2:
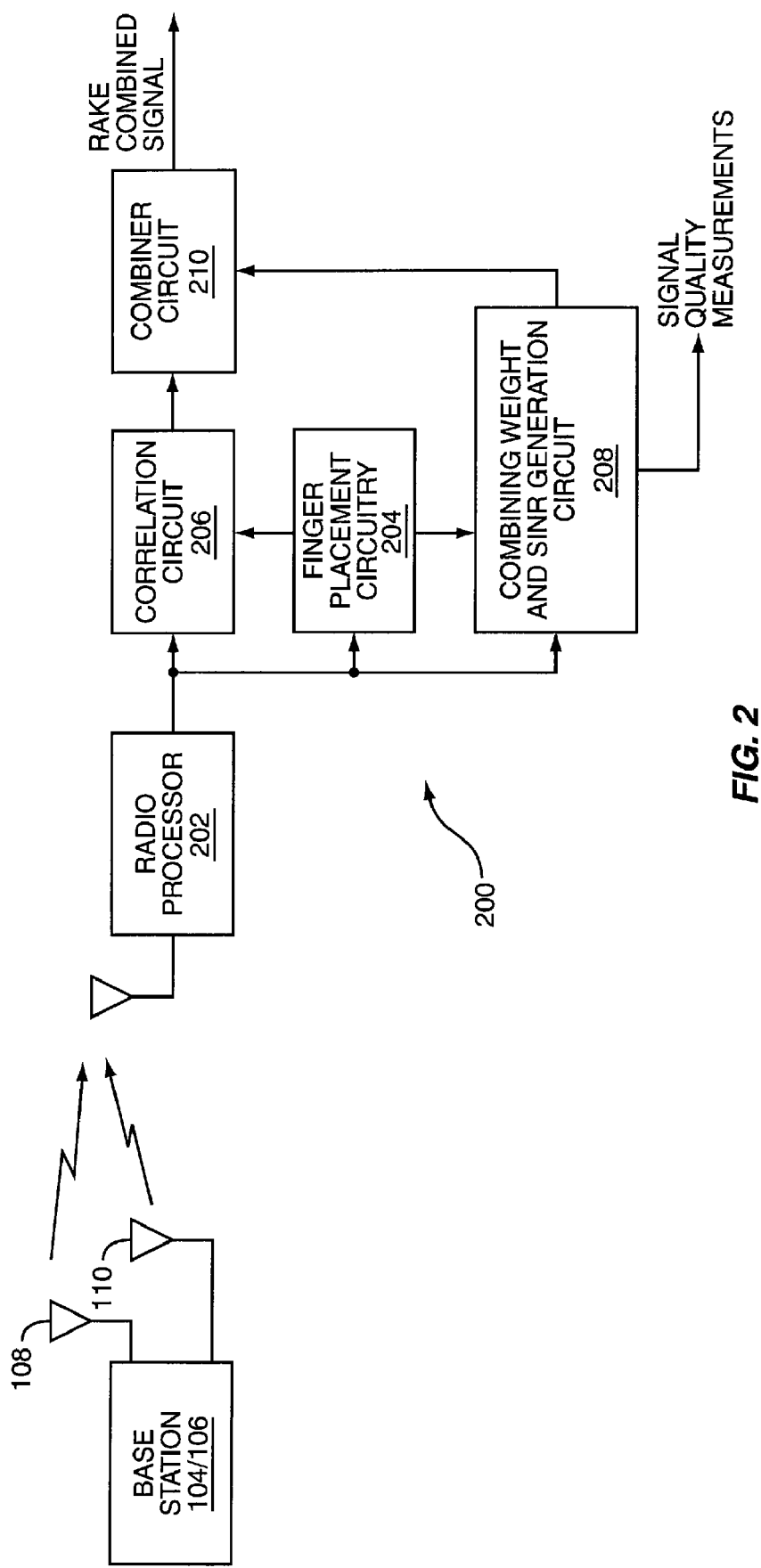
FIG. 2 is a functional block diagram of a symbol-level LIW receiver in transmit diversity.

There are two main types of LIW receiver architectures. One is symbol-level equalization, which typically uses maximum likelihood estimation, which includes the G-Rake receiver 200, illustrated in block diagram form in FIG. 2. A radio processor 202 generates chip samples from a received information signal transmitted by primary and secondary antennas 108, 110 at the base station. The chip samples are provided to a finger placement circuit 204, which determines the "finger delays," usually including multipath delays, used to despread a received signal in a correlation unit 206. The finger delays are also provided to a weight computer 208 that computes combining weights which are used to combine the despread values in a combiner 210 to produce soft values.

Figure 3:
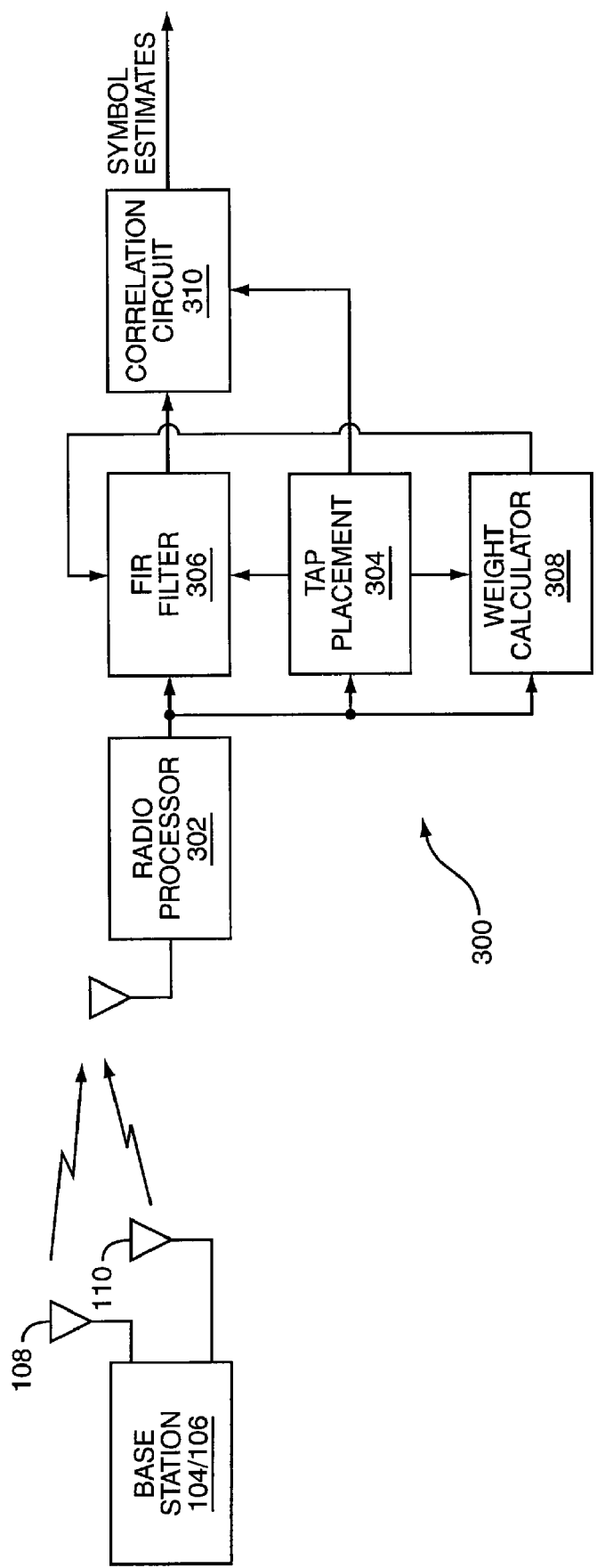
FIG. 3 is a functional block diagram of a chip-level LIW receiver in transmit diversity.

The other type of LIW receiver is a chip-level equalizer, which typically includes Minimum Mean-Square Error (MMSE) transversal chip equalization 300, as illustrated in block diagram form in FIG. 3. A radio processor 302 generates chip samples from a received information signal transmitted by primary and secondary antennas 108, 110 at the base station. The chip samples are provided to a tap placement circuit 304, which determines the tap delays, related to multipath delays, for a Finite Impulse Response (FIR) filter 306. The selected tap delays are also provided to a weight calculator 308 that computes filter coefficients (or weights) for the FIR filter 306. The FIR filter 306 filters the chip samples to produce a signal that is despread by a correlator 310 to produce symbol estimates.

Both types of LIW receivers 200, 300 rely on an estimate of a covariance matrix. In the case of maximum likelihood (G-Rake) processing, the covariance matrix is an impairment covariance matrix. In the case of MMSE processing, it is a data covariance matrix. According to embodiments described herein, a parametric model of the impairment or data covariance is created by summing terms that model each source of interference, including, for example, a term for each possible phase offset at the secondary antenna 110. The terms are weighted by fitting parameters. The fitting parameters are jointly solved by fitting the covariance estimate to a measured impairment or data covariance. For convenience, this process is described with respect to a G-Rake receiver and an impairment covariance matrix. However, the use of a data covariance matrix in the case of a chip equalizer is directly analogous.

Figure 4:
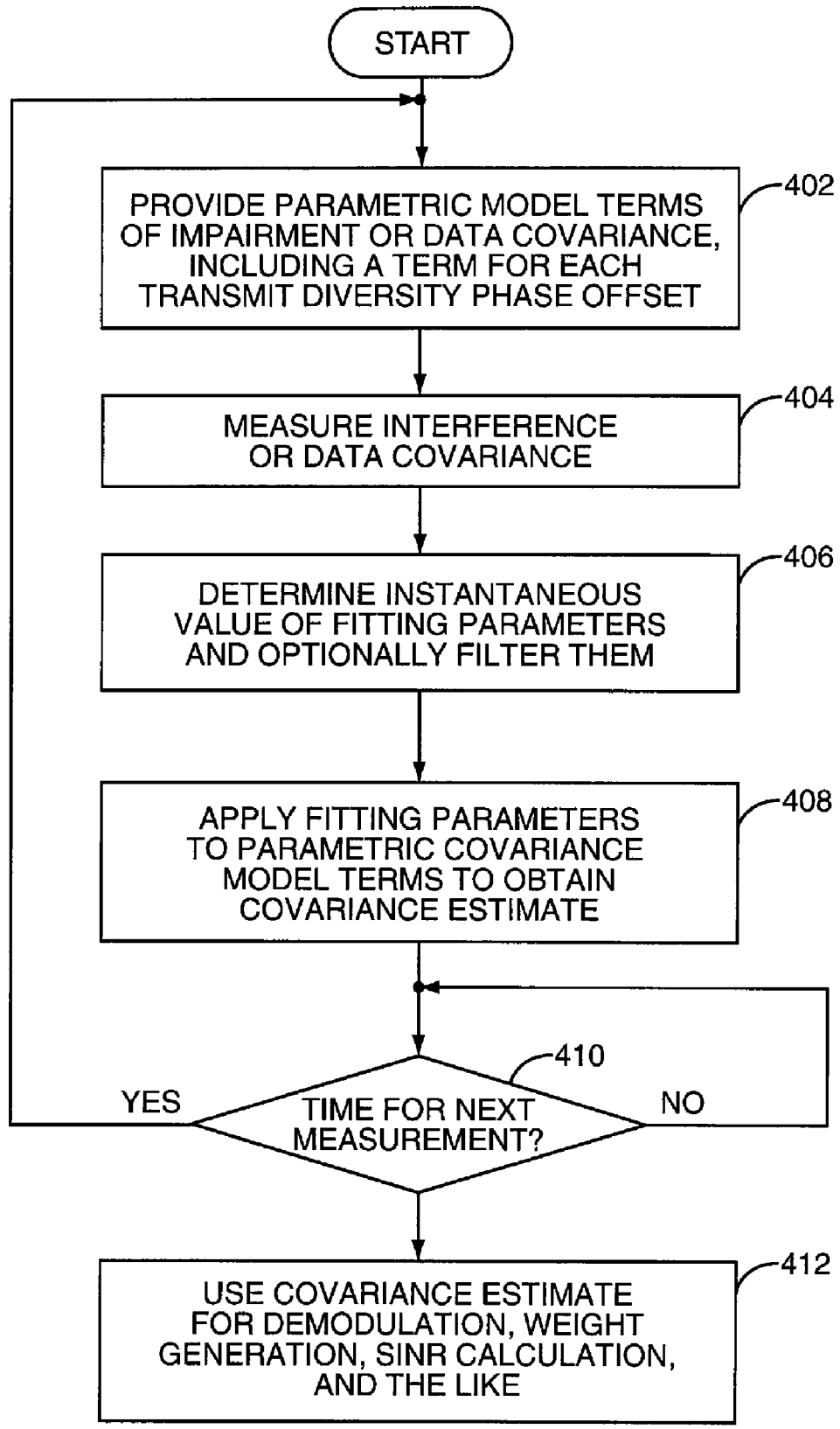
FIG. 4 is a flow diagram of a parametric method of estimating the data or interference covariance of a received signal of interest in a transmit diversity system.

A method of estimating covariance is depicted in FIG. 4. Parametric model terms of received signal impairment correlations are provided (block 402). The model may, for example, comprise a parametric model of impairment covariance in a transmit diversity system:

$$R = \alpha_0 R(\hat{g}_0) + \alpha_1 R(\hat{g}_1) + \beta R_n + \sum \lambda_i R_i(\hat{g}_0, \hat{g}_1) \qquad (1)$$

where $\hat{g}_0$ is the channel estimate (medium response) associated with the primary transmit antenna 108;

$\hat{g}_1$ is the channel estimate (medium response) associated with the secondary transmit antenna 110;

$\alpha_0$ is a fitting parameter associated with own-cell signals transmitted only from the primary antenna 108;

$\alpha_1$ is a fitting parameter associated with own-cell signals transmitted only from the secondary antenna 110;

$\beta$ is a fitting parameter associated with white noise and interference not modeled in other terms;

$\lambda_i$ is a fitting parameter associated with users in transmit diversity with relative phase $\theta_i$;

$R(\hat{g}_0)$ is the normalized impairment covariance model term for own-cell signals transmitted only from the primary antenna 108; and $R_i(\hat{g}_0, \hat{g}_1)$ is the normalized impairment covariance model term for users in transmit diversity with relative phase $\theta_i$.

The term $R(\hat{g}_0)$ is defined in patent application publication number 2005/0201447 referenced above, and depends on the pulse shape autocorrelation function as well as the medium response channel estimate. Elements in this matrix correspond to pairs of fingers. For example, for finger 1 (associated with delay $d_1$ and receive antenna $a_1$) and finger 2 (associated with delay $d_2$ and receive antenna $a_2$), the corresponding matrix element is given by $$r(f_1, f_2) = \sum_{k=0}^{L-1} \sum_{q=0}^{L-1} g_0(k, a_1) g_0^*(q, a_2) \qquad (2)$$

$$\sum_{m=-\infty, m \neq 0}^{\infty} r_p(d_1 - \tau_k - mT_c) r_p^*(d_2 - \tau_q - mT_c)$$

where

L is the number of paths;

$g_0(m, a_r)$ is the medium response channel estimate associated with transmit antenna 0 and receive antenna $a_r$ and path delay $\tau_m$; and $r_p(\tau)$ is the chip pulse shape autocorrelation function.

In one embodiment, the infinite summation may be computed using a table lookup. The lookup table can be created using a close-form expression, as disclosed by Jatunov and Madisetti in "Closed form for infinite sum in bandlimited CDMA," IEEE Communications Letters, volume 8, pages 138-140, March, 2004, incorporated herein by reference in its entirety. An efficient form of computation using frequency-domain processing is described in co-pending U.S. patent application Ser. No. 11/479,483, EFFICIENT COMPUTATION OF INTERFERENCE MATRIX FOR PARAMETRIC G-RAKE, filed Jun. 30, 2006, assigned to the assignee of the present application and incorporated herein by reference in its entirety.

Equation (1) includes a summation over the four possible transmit relative phases. This term accounts for the fact that the same symbols are being transmitted on the same scrambled Walsh codes on the two transmit antennas 108, 110. Like $R(\hat{g}_0)$, elements in $R_i(\hat{g}_0, \hat{g}_1)$ depend on the chip pulse shape autocorrelation function and medium response channel estimates. Unlike $R(\hat{g}_0)$, they depend on the medium response channel estimates associated with more than one transmit antenna as well as relative transmit phases. In particular, the elements of $R_i(\hat{g}_0, \hat{g}_1)$ are given by $$R_i(\hat{g}_0, \hat{g}_1) = R\left(\hat{g}_0 + e^{j\theta_i} \sqrt{\frac{\gamma_p(0)}{\gamma_p(1)}} \hat{g}_1\right) = R(\hat{c}_i) \qquad (3)$$

where $\hat{c}_i$ is a virtual medium channel response estimate corresponding to relative transmit phase $\theta_i$. Note: when forming processing weights (combining weights in a symbol-level receiver or filter weights in a chip-level receiver), a virtual net channel response is needed similar to the virtual medium channel response. The inclusion of the factor $\sqrt{\gamma_p(0)/\gamma_p(1)}$ compensates for the fact that the pilot power allocations between the primary and secondary transmit antennas may not be balanced. It ensures that the estimated virtual channel is matched to the actual virtual channel experienced by the transmitted signal in the presence of pilot power imbalance. While here a single scaling factor, based on a ratio of powers, is used, other compensation techniques are possible. For example, each channel estimate can be scaled by the reciprocal of its associated pilot amplitude.

As discussed above, the parametric model is equally applicable to parametric data covariance estimation for MMSE processing. In this case, equation (2) changes slightly, in that the infinite summation term does not exclude m=0.

The data or interference covariance is next measured (FIG. 4, block 404). The data covariance can be measured using vectors (elements per finger) of the despread values denoted y(m), where m is a time index. The vectors can correspond to pilot symbols, data symbols, or both. If different spreading factors are used, then some additional scaling may be needed. The measured data covariance is simply the sum of vector outer products, i.e., $$\tilde{R}_{meas} = \sum_m y(m) y^H(m)$$

This measurement may be performed over some time interval, and possibly further smoothed using exponential filtering, as discussed in U.S. patent application 2005/0201447. Because of the bursty nature of packet data systems, the measurement may advantageously correspond to a transmission time interval (TTI) of a packet or a fraction of a TTI (e.g., a WCDMA timeslot).

The impairment covariance may be measured using the common pilot symbols and forming a covariance measurement. As described in application publication number 2005/0201447, this can be done using the two pilot channels, one for each transmit antenna 108, 110, and averaging or adding the results. In particular, $$R_{meas} = \sum_m \begin{matrix} \left[S_0^*(m)\bar{y}_{p,0}(m) - \hat{h}_0\right] \\ \left[S_0^*(m)\bar{y}_{p,0}(m) - \hat{h}_0\right]^H + \\ \left[S_1^*(m)\bar{y}_{p,1}(m) - \hat{h}_1\right] \\ \left[S_1^*(m)\bar{y}_{p,1}(m) - \hat{h}_1\right]^H \end{matrix}$$

or $$R_{meas} = \sum_m \begin{matrix} \left[\bar{y}_{p,0}(m) - \hat{h}_0 S_0(m)\right] \\ \left[\bar{y}_{p,0}(m) - \hat{h}_0 S_0^*(m)\right]^h + \\ \left[\bar{y}_{p,1}(m) - \hat{h}_1 S_1(m)\right] \\ \left[\bar{y}_{p,1}(m) - \hat{h}_1 S_1(m)\right]^h \end{matrix}$$

where $S_i(m)$ is the pilot supersymbol (length 512) associated with transmit antenna i, $\bar{y}_{p,i}(m)$ is the supersymbol despread vector associated with the common pilot channel on transmit antenna i (despreading with spreading factor 512); and $\hat{h}_i$ is the net response channel estimate associated with transmit antenna i, Here $\bar{y}_{p,0}(m)$ is obtained using an all 1's despreading sequence of length 512, whereas $\bar{y}_{p,1}(m)$ is obtained using a despreading sequence of the form (1, 1, 1 . . . , 1,1,-1, -1, . . . ,-1), i.e., a sequence of 256 1's followed by 256-1's. Note that supersymbols are indexed with even values of m (odd values are skipped), so that supersymbol m corresponds to length-256 symbols m/2 and m/2+1. For the primary transmit antenna 108 (0), the supersymbol is simply $(1+j)/\sqrt{2}$. For the secondary transmit antenna 110 (1), the supersymbol value is $$S_1(m) = \frac{1}{\sqrt{2}}(1 + j)M_{m/2}$$

To be more efficient, the supersymbol despread vectors can be formed using despread vectors associated with spreading factor 256 as follows $$\bar{y}_{p,0}(m) = \frac{y_p(m/2) + y_p(m/2 + 1)}{2}$$

$$\bar{y}_{p,1}(m) = \frac{y_p(m/2) - y_p(m/2 + 1)}{2}$$

The division by 2 may be omitted, depending on how the net response channel estimate is defined. Note that these sums and differences can be used in channel estimation as well, as described below.

Alternatively, the measured impairment covariance may be obtained by working directly with length-256 despread values, using $$R_{meas} = \sum_k \left[y_p(k) - (\hat{h}_0 + M_k \hat{h}_1)s_p(k)\right]\left[y_p(k) - (\hat{h}_0 + M_k \hat{h}_1)s_p(k)\right]^H$$

where $y_p(k)$ is the length-256 despread pilot symbol value.

As $M_k$ is +1 or −1, the terms in parentheses are simply sums and differences of channel estimates. The net response channel estimates can be obtained using a correlation-based approach, such as $$\hat{h}_0 = (1/N_p)\sum_{k=0}^{N_p-1} s_p^*(k)y_p(k)$$

$$\hat{h}_1 = (1/N_p)\sum_{k=0}^{N_p-1} M_k s_p^*(k)y_p(k)$$

where $N_p$ is an even number of length-256 pilot symbols (e.g., 10). Alternatively, the partial sums described above can be used for channel estimation, i.e., $$\hat{h}_0 = (2/N_p)\sum_{m=0}^{N_p/2-1} S_0^*(m)y_{p,0}(m)$$

$$\hat{h}_1 = (2/N_p)\sum_{m=0}^{N_p/2-1} S_1^*(m)y_{p,1}(m)$$

Once the measured data or impairment covariance is obtained, the fitting parameters in the parametric covariance model may be determined by fitting the weighted sum of model terms to the measured covariance (FIG. 4, block 406). A least-squares or other fitting approach can be used, treating equations with complex quantities as two real-value equations, as described in U.S. patent application 2005/0201447. Clipping of values at zero can be used, as well as other clipping procedures, as described in published U.S. patent application number 2006/0007990, METHOD AND APPARATUS FOR SCALING PARAMETER ESTIMATION IN PARAMETRIC GENERALIZED RAKE RECEIVERS, filed Sep. 2, 2005, assigned to the assignee of the present application and incorporated herein by reference in its entirety. The instantaneous values of the fitting parameters may additionally be smoothed, or filtered, as described in U.S. patent application 2005/0201447, to reduce the effects of transient channel conditions. Note that some of the fitting parameters may be excluded (preset to zero). For example, all but one of the $\lambda_i$ may be set to zero to model just the desired user or a dominant user being in transmit diversity. In general, the fitting parameters form an overdetermined set, so some parameters need to be preset to zero. For example, $\lambda_3$ and $\lambda_4$ can be preset to zero. Even though there may be energy on those corresponding transmit diversity modes, it will be captured in the remaining fitting parameters.

Once the fitting parameters (e.g., $\alpha_0$, $\beta$, $\lambda_i$) have been determined from the measured covariance, they are applied to the parametric covariance model terms to generate a covariance estimate (block 408). Periodically, such as at every WCDMA timeslot, the process is repeated (block 410), to dynamically adapt the covariance estimate to changing channel conditions and interference profiles.

The parametric covariance estimate may be used in a number of ways (block 412). For example, it may be used to demodulate a received signal of interest in any of several ways. The covariance estimate can be used to form processing weights for a symbol-level or chip-level equalization, as described in U.S. patent application 2005/0201447 and copending U.S. patent application 2005/0078742, APPARATUS METHODS AND COMPUTER PROGRAM PRODUCTS FOR DELAY SELECTION IN A SPREAD-SPECTRUM RECEIVER, filed Oct. 6, 2004, assigned to the assignee of the present application and incorporated herein by reference in its entirety. These processing weights can be used for either demodulating traffic symbols or as a criterion for finger selection or tap placement, as described in U.S. patent application Ser. No. 10/959,923. The parametric covariance estimate can also be used to form an SINR estimate as described in U.S. patent application 2005/0201447 for symbol-level receivers, and as described in published U.S. patent application 2006/0067383 for chip-level receivers.

Although described herein in terms of own-cell interference, the present invention may be applied using model terms to model other-cell interference. For example, a single other-cell covariance term per dominant interfering base station may be added to equation (1), as described in U.S. patent application 2005/0201447. Additionally or alternatively, multiple covariance terms may be added to a count for transmit diversity being used in other cells. Soft handoff may be handled as described in U.S. patent application 2005/0201447. Although described herein in terms of downlink reception, the present invention may be applied in the uplink as well.

Embodiments of the present invention provide improved interference suppression for both symbol-level (G-Rake) and chip-level (chip equalizer) LIW receivers, which are the two main architectures for type II receivers in WCDMA systems.

Although the present invention has been described herein with respect to particular features, aspects and embodiments thereof, it will be apparent that numerous variations, modifications, and other embodiments are possible within the broad scope of the present invention, and accordingly, all variations, modifications and embodiments are to be regarded as being within the scope of the invention. The present embodiments are therefore to be construed in all aspects as illustrative and not restrictive and all changes coming within the meaning and equivalency range of the appended claims are intended to be embraced therein.

What is claimed is:

1. A method of processing a received information signal transmitted from at least primary and secondary transmit antennas, the method comprising:
   receiving a spread-spectrum information signal transmitted from at least primary and secondary transmit antennas, the secondary antenna transmitting the signal using one of a plurality of known antenna weights relative to the primary antenna;
   computing impairment or data covariance terms corresponding to the plurality of known, relative antenna weights of the secondary antenna;
   measuring an impairment or data covariance associated with the received information signal;
   jointly estimating values of fitting parameters in response to the measured impairment or data covariance and the computed impairment or data covariance terms; and
   estimating a received signal impairment or data covariance for the received information signal by applying the estimated values of the fitting parameters to the impairment or data covariance terms.

2. The method of claim 1 wherein computing impairment or data covariance terms further comprises summing a term corresponding to the primary antenna.

3. The method of claim 2 wherein the term corresponding to the primary antenna depends on a pulse shape autocorrelation function and a medium response channel estimate.

4. The method of claim 1 wherein computing impairment or data covariance terms further comprises computing a term corresponding to noise.

5. The method of claim 1 wherein computing impairment or data covariance terms further comprises computing one or more terms, each corresponding to an interfering transmit antenna.

6. The method of claim 1 wherein computing impairment or data covariance terms further comprises computing a term corresponding to signals transmitted only from the secondary antenna.

7. The method of claim 1 wherein measuring an impairment or data covariance comprises forming a covariance measurement using common pilot symbols associated with the received information signal.

8. The method of claim 7 wherein forming a covariance measurement using common pilot symbols comprises forming overlapping pilot despread values corresponding to signals transmitted from the primary and secondary antennas.

9. The method of claim 8 wherein forming overlapping pilot despread values comprises forming sums of differences of pilot despread values.

10. The method of claim 1 further comprising demodulating the received signal of interest using the estimated received signal impairment or data covariance.

11. The method of claim 10 further comprising using the estimated received signal impairment or data covariance to select processing delays.

12. The method of claim 11 further comprising using the estimated received signal impairment covariance to select processing delays in a symbol-level equalizer.

13. The method of claim 11 further comprising using the estimated received signal data covariance to select processing delays in a chip-level equalizer.

14. The method of claim 10 further comprising using the estimated received signal impairment or data covariance to form processing weights.

15. The method of claim 14 further comprising using the estimated received signal impairment covariance to form combining weights in a symbol-level equalizer.

16. The method of claim 14 further comprising using the estimated received signal data covariance to form filter weights in a chip-level equalizer.

17. The method of claim 1 further comprising forming a SINR estimate using the estimated received signal impairment or data covariance.

18. The method of claim 17 further comprising using the estimated received signal impairment covariance to form a SINR estimate in a symbol-level equalizer.

19. The method of claim 17 further comprising using the estimated received signal data covariance to form a SINR estimate in a chip-level equalizer.

20. The method of claim 1 wherein computing impairment or data covariance terms further includes using pilot power allocation information.

21. The method of claim 20 wherein pilot power allocation information is obtained from control signaling.

22. The method of claim 20 wherein pilot power allocation information is estimated from the received signal.

23. A wireless communication receiver for use in a mobile terminal in a transmit diversity wireless communication system, comprising:
- a radio front-end circuit configured to provide a received signal of interest transmitted simultaneously from a primary antenna and from a secondary antenna with one of a plurality of relative phase offsets; and
- a receiver circuit configured to generate one or more symbol estimates by applying processing weights to one of chips samples and despread values;
- the receiver circuit configured to calculate processing weights by:
- computing a covariance associated with each possible phase offset at the secondary antenna;
- measuring an impairment or data covariance;
- jointly estimating values of fitting parameters in response to the measured and computed covariances; and
- estimating a received signal covariance for the signal of interest by applying the estimated values of the fitting parameters to parametric covariance model terms.

24. The receiver of claim 23 wherein the receiver circuit is further configured to compute a covariance associated with the primary antenna.

25. The receiver of claim 23 wherein the receiver circuit is further configured to compute a covariance associated with noise.

26. The receiver of claim 23 wherein computing the covariances comprises forming one or more covariance matrices, wherein elements of the covariance matrices are determined from channel estimates corresponding to pilot signals from primary and secondary antennas.

27. The receiver of claim 23 wherein jointly estimating values of fitting parameters in response to the measured and computed covariances comprises performing a least squares fit of fitting parameters to make a weighted sum of covariance matrices associated with the primary antenna, each phase offset of the secondary antenna, and noise closely match the measured covariance.

28. The receiver of claim 23 wherein measuring an impairment or data covariance comprises forming overlapping pilot despread values corresponding to two or more transmit signals.

29. The receiver of claim 28 further comprising forming sums of differences of pilot despread values for use in channel estimation.

30. The receiver of claim 28 further comprising forming sums of differences of pilot despread values for use in impairment covariance measurement.

31. The receiver of claim 23 wherein the receiver circuit is a G-Rake receiver circuit.

32. The receiver of claim 23 wherein the receiver circuit is a chip equalizer circuit.

* * * * *

UNITED STATES PATENT AND TRADEMARK OFFICE
CERTIFICATE OF CORRECTION

PATENT NO. : 7,848,387 B2  
APPLICATION NO. : 11/751109  
DATED : December 7, 2010  
INVENTOR(S) : Jonsson et al.

Page 1 of 1

It is certified that error appears in the above-identified patent and that said Letters Patent is hereby corrected as shown below:

On Page 2, in Field (56), under "OTHER PUBLICATIONS", in Column 1, Line 4, delete "Bommonley," and insert -- Bottomley, --, therefor.

In Column 7, Line 16, delete " $\tilde{h}_0 S_0^*(m)]^{\mu}$ " and insert -- $-\hat{h}_0 S_0^*(m)]^{\mu}$ --, therefor.

In Column 7, Line 20, delete " $-\tilde{h}_1 S_1(m)]^{\mu}$ " and insert -- $-\hat{h}_1 S_1(m)]^{\mu}$ --, therefor.

In Column 7, Line 31, delete "antenna i," and insert -- antenna i. --, therefor.

Signed and Sealed this  
Fourth Day of October, 2011

David J. Kappos  
*Director of the United States Patent and Trademark Office*